United States Patent [19]

Vayenas et al.

[11] Patent Number: 4,512,964
[45] Date of Patent: Apr. 23, 1985

[54] METHOD FOR FORMING NITRIC OXIDE FROM AMMONIA

[75] Inventors: Costas G. Vayenas, Wellesley Hills; Catherine E. Teague, Cambridge, both of Mass.

[73] Assignee: Massachusetts Institute of Technology, Cambridge, Mass.

[21] Appl. No.: 591,893

[22] Filed: Mar. 21, 1984

Related U.S. Application Data

[63] Continuation of Ser. No. 315,673, Oct. 27, 1981, abandoned, which is a continuation of Ser. No. 171,679, Jul. 24, 1980, abandoned.

[51] Int. Cl.³ ............................................. C01B 21/26
[52] U.S. Cl. .................................................. 423/403
[58] Field of Search ......................... 423/393, 403, 404

[56] References Cited

U.S. PATENT DOCUMENTS 3,576,600  4/1971  Hardison ............................. 423/393

FOREIGN PATENT DOCUMENTS 0135224  11/1919  United Kingdom ................. 423/403
 274099   1/1928  United Kingdom ................. 423/403

Primary Examiner—John Doll
Assistant Examiner—Wayne A. Langel
Attorney, Agent, or Firm—Arthur A. Smith, Jr.; Paul J. Cook

[57] ABSTRACT

Nitric oxide is formed by the oxidation of ammonia. An ammonia containing gas is contacted with an oxidation catalyst comprising stainless steel in the presence of oxygen at a temperature between about 500° C. and 1100° C. in order to effect a reaction selectivity of at least 50%.

1 Claim, 7 Drawing Figures

METHOD FOR FORMING NITRIC OXIDE FROM AMMONIA

The Government has rights in this invention by virtue of Grant No. Eng. 77-27500 from the National Science Foundation and IPA-0010.

This is a continuation of application Ser. No. 315,673, filed Oct. 27, 1981, abandoned, which is a continuation of application Ser. No. 171,679, filed July 24, 1980, abandoned.

BACKGROUND OF THE INVENTION

This invention relates to a process for oxidizing ammonia to form nitric oxide.

The oxidation of ammonia ($NH_3$) to form nitric oxide (NO) is a reaction of great industrial significance, since the production of nitric oxide is the first step in the synthesis of nitric acid. Nitric acid currently ranks tenth among the chemicals produced in the United States with a yearly domestic production rate of 8.6 million tons. Industrially, the conversion of $NH_3$ to NO is carried out over fine mesh platinum (90%)-rhodium (10%) alloy screens at temperatures between 750° and 950° C. Pressures within the range 1-9 atm are typically employed with a feed stream of 10% $NH_3$ in air. The reaction is extremely rapid (one millisecond or less) and conversion of $NH_3$ to NO ranges from 94-98%. The disadvantages of the Pt catalyst are its high price and operating cost. For a plant operating at 1 atm and 800° C., a catalyst loss of 50 mg per ton 100% nitric acid is representative.

The oxides of Fe, Mn, Bi, Co, Ni, Cr and Cu have long been studied as alternative catalysts for the $NH_3$ oxidation process. During World War I, a composition of 90% $Fe_2O_3$, 5% $Mn_2O_3$ and 5% $Bi_2O_3$ was used as a substitute in the form of granules or pellets. Presently, a porous iron-chromium oxide catalyst deposited on a mechanically strong support is used in industry in a second stage oxidation of $NH_3$. This catalyst can attain conversions of 97% with a 10% $NH_3$ air mixture, contact times on the order of 20 milliseconds and temperatures in the range 700°-800° C.

The oxide metal catalysts suffer from several disadvantages. Their lifetime usually does not exceed three months and their mechanical strength is low. Because the non-platinum catalysts are used in the form of pellets or granules (either unsupported or supported) and because the required contact time is longer than for Pt, more cumbersome reactors are necessary for their utilization. Consequently, these substitutes cannot compete economically with Pt.

SUMMARY OF THE INVENTION

This invention provides a means for oxidizing ammonia to from nitric oxide selectively in the presence of a catalyst comprising stainless steel. The reaction is effected by mixing ammonia in an excess of oxygen at a temperature between about 500° C. and 1000° C. The stainless steel catalyst provides a conversion between 50% and 100% with a selectivity to nitric oxide of at least 50%.

This invention provides substantial operating advantages over the prior art techniques for oxidizing ammonia to form nitric oxide. The primary advantage is the low cost of stainless steel compared to platinum and that the stainless steel catalyst can also be utilized to form the reactor within which the reaction occurs in a manner so that pressure drop through the reactor can be minimized.

DESCRIPTION OF SPECIFIC EMBODIMENTS

Figure 1:
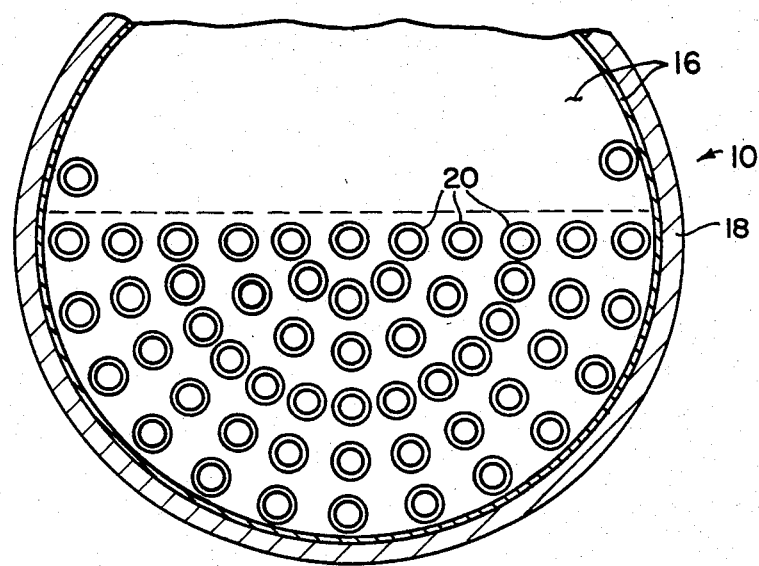
FIG. 1 is a front view of a reactor utilized in the present invention.

In the process of this invention stainless steel is utilized to catalyze the ammonia oxidation with a selectivity at least 50% and about 100% in the temperature range 600°-1000° C. with a corresponding conversion of at least about 100%. Although stainless steel, which is composed chiefly of iron and chromium, may form some oxides at the high temperatures of operation, this catalyst possesses characteristics quite different from the metal oxides. It is nonporous and need not be used in the form of granules. Passing the reactants through a stainless steel tube is sufficient to catalyze the reaction, whereas with the metal oxides a fixed bed reactor must be employed with its accompanied pressure drop. Selectivities of at least 50% are achieved when the ratio of oxygen to ammonia is greater than the stoichiometric ratio of 1.25. Selectivity also increases with temperature. The process of the invention must be conducted at a temperature between about 500° C. and 1000° C., preferably between about 700° C. and 850° C. with a volume ratio of oxygen to ammonia ($O_2/NH_3$) being greater than about 0.5, preferably greater than 1.25. Reaction temperatures are initiated by preheating the gaseous reactants and/or reactors. It has been found that when operating outside this temperature range and outside the desired oxygen to ammonia ratios, conversion of ammonia and selectivity to nitric oxide are substantially reduced. The reaction proceeds according to the exothermic reaction: $NH_3 + 5/4 O_2 \rightarrow NO + 3/2 H_2O$. Since a mixture of ammonia and oxygen are potentially explosive, it is preferred to operate with an excess of air so that the volume percent of ammonia is less than about 11%. The resulting NO is converted to nitric acid in two subsequent steps: (1) a homogeneous oxidation of the cooled NO and $NO_2$ and (2) dissolution of $NO_2$ in water accompanied by further oxidation to produce nitric acid.

Suitable stainless steel for use as catalysts herein are those containing at least about 1% chromium, at least about 0.1 weight % nickel, carbon and wherein the major component of the remaining alloy is iron. A particularly suitable stainless steel is SS-316 which contains 23% chromium, 18% nickel, 2% molybdenum, 0.5% carbon, the balance iron. It is to be understood that it is preferred to utilize stainless steel as the sole catalyst. However, it is within the scope of this invention to utilize a supplementary conventional catalyst if desired, so long as the reaction conditions set forth above are maintained.

In accordance with this invention, it is preferred to form the reactor itself from the stainless steel catalyst so as to form channels through which the reactants pass with a minimum of pressure drop.

The length and width of the channels are chosen in order to permit substantially complete oxidation of ammonia. The gaseous reactants are passed through the reactor at a linear velocity which assures turbulent gas flow so that adequate contact of gas and catalyst is obtained. Generally suitable linear gas velocities are within the range of between about 0.5 ft/sec and 100 ft/sec, more usually between about 5 ft/sec and 50 ft/sec. The overall length of the channels, whether straight or convoluted, is adequate to achieve substantially complete oxidation of ammonia to nitric oxide while minimizing pressure drop in the reactor. Generally, the length of the channels is between about 0.02 ft. and 15 ft., and more usually about 0.2 and 5 ft. The width of the channels generally is between about $\frac{1}{4}$ inch and 100 inch, more usually between about 1 inch and 50 inch.

Figure 2:
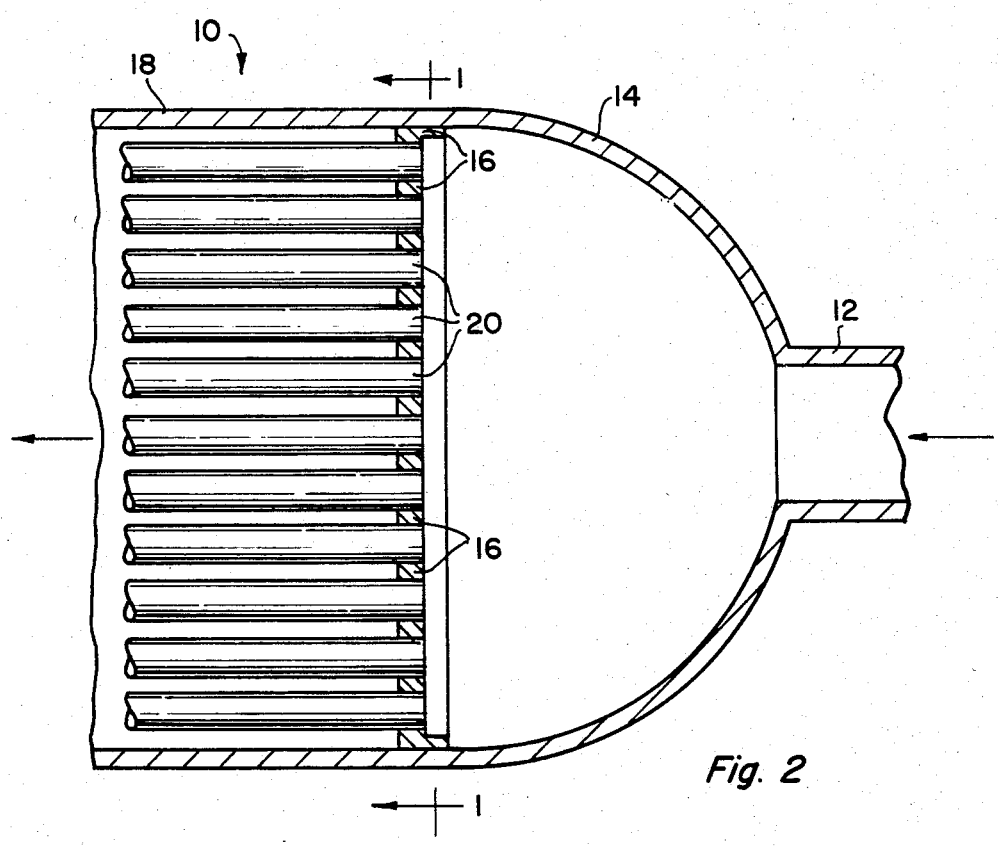
FIG. 2 is a partial cross-sectional side view of the reactor of FIG. 1.

The invention now will be described with reference to the accompanying figures. The invention shown in FIGS. 1 and 2 utilizes channels for gas which extend parallel to gas flow. The reactor 10 includes an inlet conduit 12 and a header 14. A plate 16 extends across the cross-sectional area of the reactor 10 and is secured to the reactor shell wall 18 of the reactor 10 by any conventional means. The plate is provided with holes through which tubes 20 are fitted so that they are secured into the desired position. The tubes 20 are secured at their ends by two plates (one of which is not shown) and the reactor 10 is provided with a suitable outlet (not shown).

Figure 3:
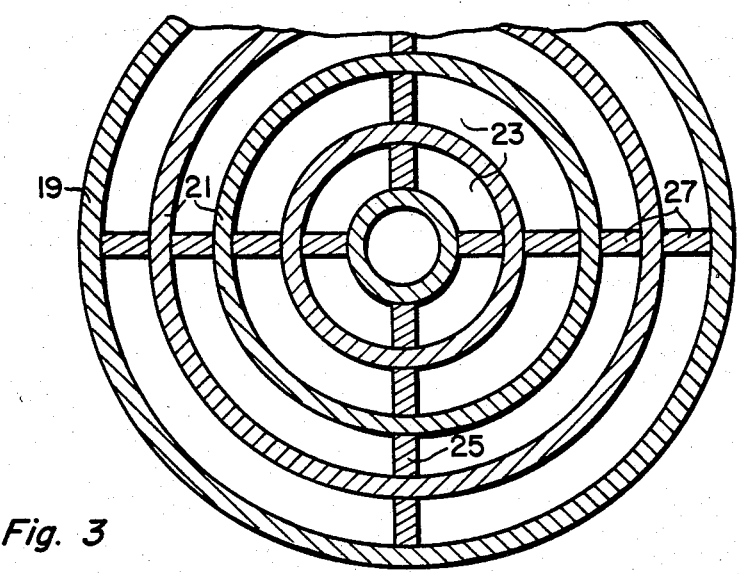
FIG. 3 is a front view of a reactor for conducting the process of this invention utilizing a concentric ring arrangement.

As shown in FIG. 3, the reactor 19 comprises a series of concentric catalytic cylindrical plates 21 which form channels 23 for the gas to be treated. The cylindrical plates are joined together by inner rods 25 and outer rods 27 which are secured to the inner wall of reactor 19. If desired, the outer rods can comprise a plate extending the length of reactor 19 which fit into slots 5 on the inner wall of reactor 19 so that the entire catalyst assembly can be slideably removed for easy replacement.

Figure 4:
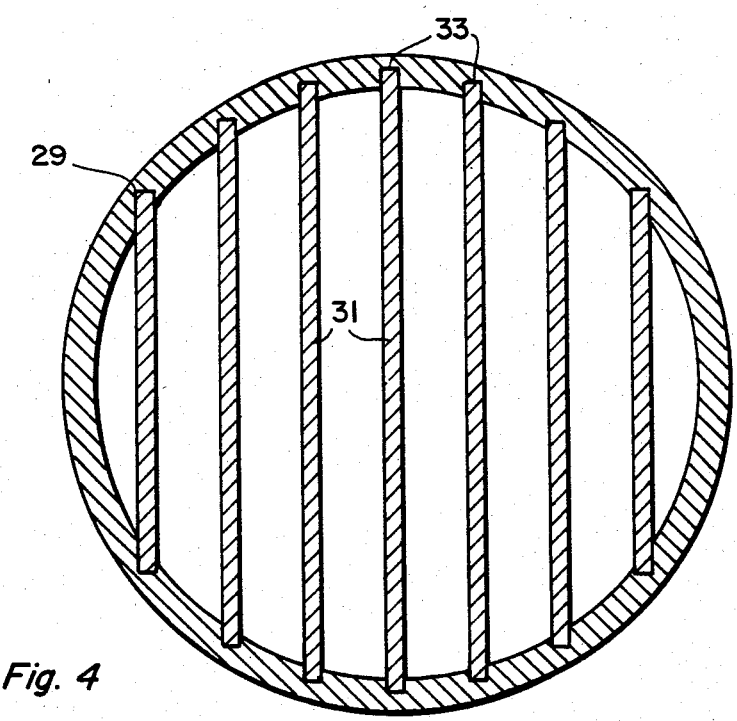
FIG. 4 is a front view of a reactor for conducting the process of the invention utilizing a parallel plate arrangement.

Referring to FIG. 4, the reactor comprises an outer shell 29 and a plurality of parallel plates 31 formed of the catalytic metal. The plates 31 extend the length of the shell 29 and can be joined thereto or can be fit into slots 33 so that they can be slideably removed from the shell 29 when they become deactivated.

Figure 5:
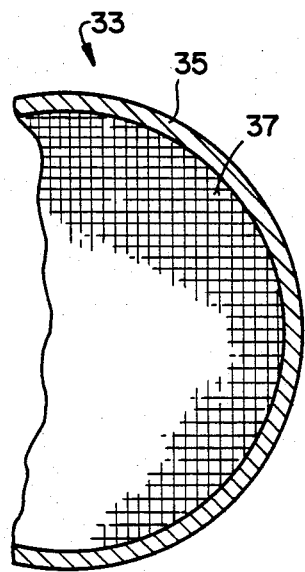
FIG. 5 is a front view of a reactor for conducting the process of this invention utilizing a screen arrangement.
Figure 6:
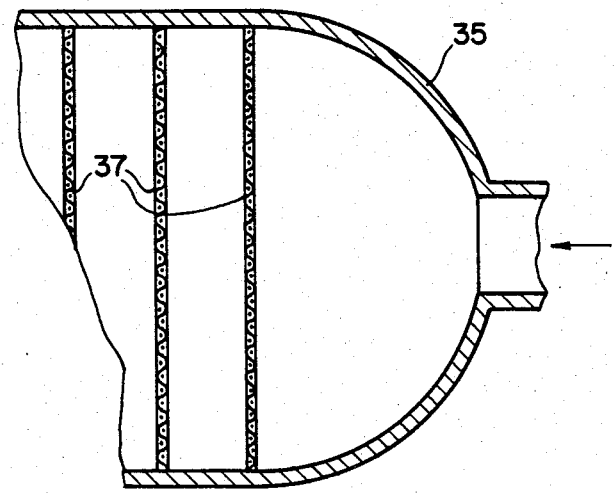
FIG. 6 is a side view of the reactor of FIG. 5.

Referring to FIGS. 5 and 6, the reactor 33 comprises a shell 35 into which are positioned a series of catalytic screens 37.

Figure 7:
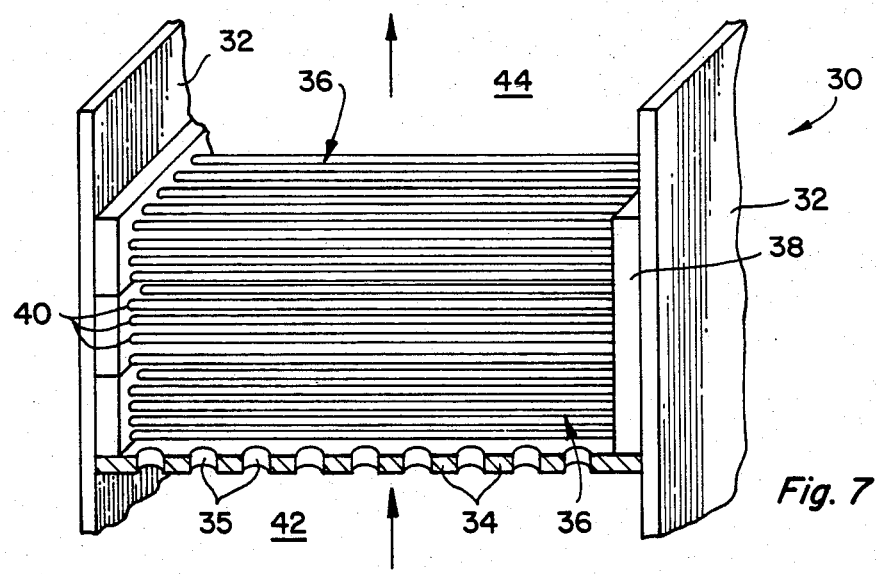
FIG. 7 is a cross-sectional side view of a reactor for conducting the process of this invention utilizing a parallel bars arrangement.

Referring to FIG. 7, a reactor system is shown wherein the stainless steel is formed into rods in a modular arrangement. The reactor 30 includes walls 32 and a porous support plate 34 having a plurality of holes 36. The plate 34 is secured to the walls 32 and provides support for the catalyst modules 36. The catalyst modules 36 comprise end supporting members 38 and catalytic rods 40 extending between the supporting members 38 and secured thereto. Incoming gas enters plenum chamber 42 and passes through the modules 36 in either parallel or convoluted flow as desired and to plenum chamber 44. While in contact with the catalytic rods 40, the ammonia and oxygen are converted to nitric oxide. After the catalytic rods 40 have become deactivated, the modules can be removed and replaced with new modules having active rods. The reactors shown in the figures can be formed integrally with existing stacks for flue gas or can be added to a stack so that the flue gas is removed from the stack, passed through the reactor and reintroduced into the stack. Furthermore, more than one reactor can be employed on a given stack.

The following example illustrates the present invention and is not intended to limit the same.

EXAMPLE I

Operating conditions:
 Ammonia feed concentration 2.0% (by volume)
 Total flow rate 200$^{cc}$/min
 Reactor Material: Stainless Steel 316
 Reactor length 65 cm
 Inner diameter of reactor 0.45 cm $$M = \frac{\text{no. moles oxygen in feed}}{\text{no. moles ammonia in feed}}$$

$$\text{Selectivity} = \frac{\text{moles nitric oxide formed}}{\text{moles ammonia reacted}}$$

$$\text{Yield} = \frac{\text{moles nitric oxide formed}}{\text{moles ammonia fed to reactor}}$$

Selectivity = Yield

| Average Temperature (°C.) | Reactor 1 M = 1.6 | Reactor 2 M = 1.3 |
| --- | --- | --- |
| 649 | 37% | |
| 699 | 44% | |
| 751 | 50% | 53% |
| 804 | 56% | 58% |
| 859 | 62% | 60% |
| 900 | 65% | 60% |
| 950 | >76% | 60% |

The total conversion is 100% in all cases. The selectivity in reactor 2 changes little with temperature. This is believed to be due to the new age of the catalyst, since reactor 1 also behaved in this manner when first operated. It is possible that selectivity is influenced by the reactor design. There is a large temperature gradient from the top to the bottom of the furnace. Therefore, as ammonia passes from the cooler to the hotter part of the reactor, some of it may decompose before it reaches the hot region. This is because ammonia decomposition is favored at low temperatures, while nitric oxide formation is favored at high temperatures.

We claim:

1. The process for oxidizing ammonia to form nitric oxide which comprises passing a feed gas containing ammonia and oxygen at an oxygen to ammonia volume ratio larger than 0.5 in contact with a stainless steel catalyst comprising stainless steel-316 containing 23% chromium, 18% nickel, 2% molybdenum, 0.5% carbon, the balance iron at a temperature between about 500° C. and 1000° C. and recovering nitric oxide produced.

* * * * *